US012670045B1

(12) United States Patent
Vergnaud

(10) Patent No.: US 12,670,045 B1
(45) Date of Patent: Jun. 30, 2026

(54) CODE IMPLEMENTED TOOL CALLS

(71) Applicant: Mistral AI, Paris (FR)

(72) Inventor: Gabriel Vergnaud, Paris (FR)

(73) Assignee: Mistral AI, Paris (FR)

( * ) Notice: Subject to any disclaimer, the term of this patent is extended or adjusted under 35 U.S.C. 154(b) by 0 days.

(21) Appl. No.: 19/557,103

(22) Filed: Mar. 4, 2026

(51) Int. Cl.
G06F 9/54 (2006.01)
(52) U.S. Cl.
CPC .................................... G06F 9/547 (2013.01)
(58) Field of Classification Search
CPC .......... G06N 20/00; G06N 3/08; G06N 3/084; G06N 5/04; G06F 9/547; G06F 9/541
See application file for complete search history.

(56) References Cited

U.S. PATENT DOCUMENTS 12,530,173 B1 * 1/2026 Buliani ...................... G06F 8/34
12,592,823 B1 * 3/2026 Manton ..................... H04L 9/32

2025/0156527 A1 * 5/2025 Palanki ................... G06F 21/53
2026/0006097 A1 * 1/2026 Pastor ..................... H04L 67/50
2026/0087325 A1 * 3/2026 Plazas .................... G06F 9/547

* cited by examiner

*Primary Examiner* — Brian W Wathen
(74) *Attorney, Agent, or Firm* — Buchalter; Jason W. Croft

(57) ABSTRACT

A method may include receiving a user request for execution of one or more tool calls. The method may also include generating a code block in a programming language. The code block may be configured to encapsulate the one or more tool calls. The method may further include executing the code block in a sandbox. The method may also include pausing execution of the code block in response to obtaining a pending tool call. The method may further include transmitting the pending tool call to a client for execution. The method may also include receiving a first result of the pending tool call. The method may further include resuming execution of the code block and substituting the first result of the pending tool call for the pending tool call in the code block. The method may also include returning a second result of the executed code block.

20 Claims, 6 Drawing Sheets

100
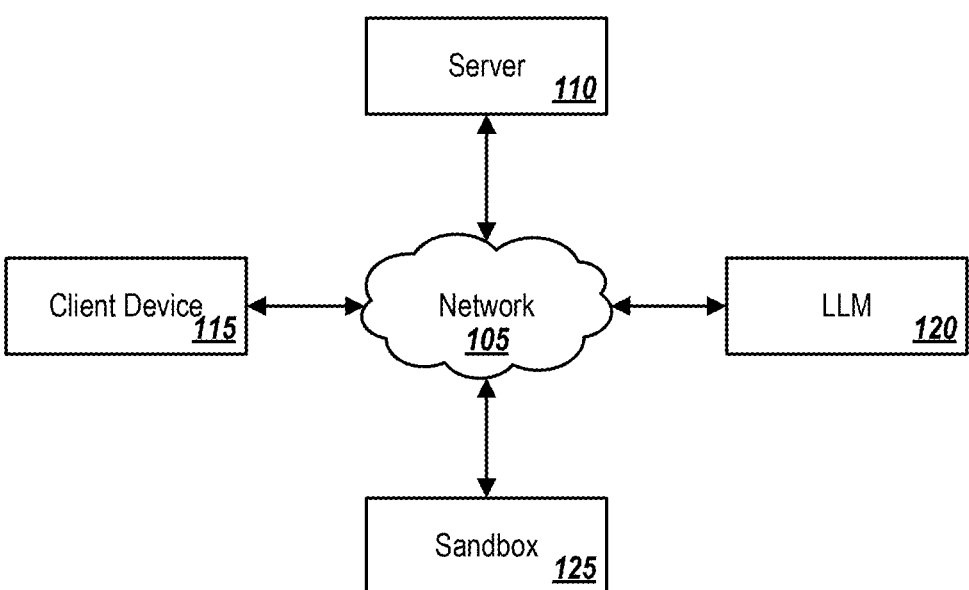
Server 110
Client Device 115
Network 105
LLM 120
Sandbox 125
FIG. 1

300

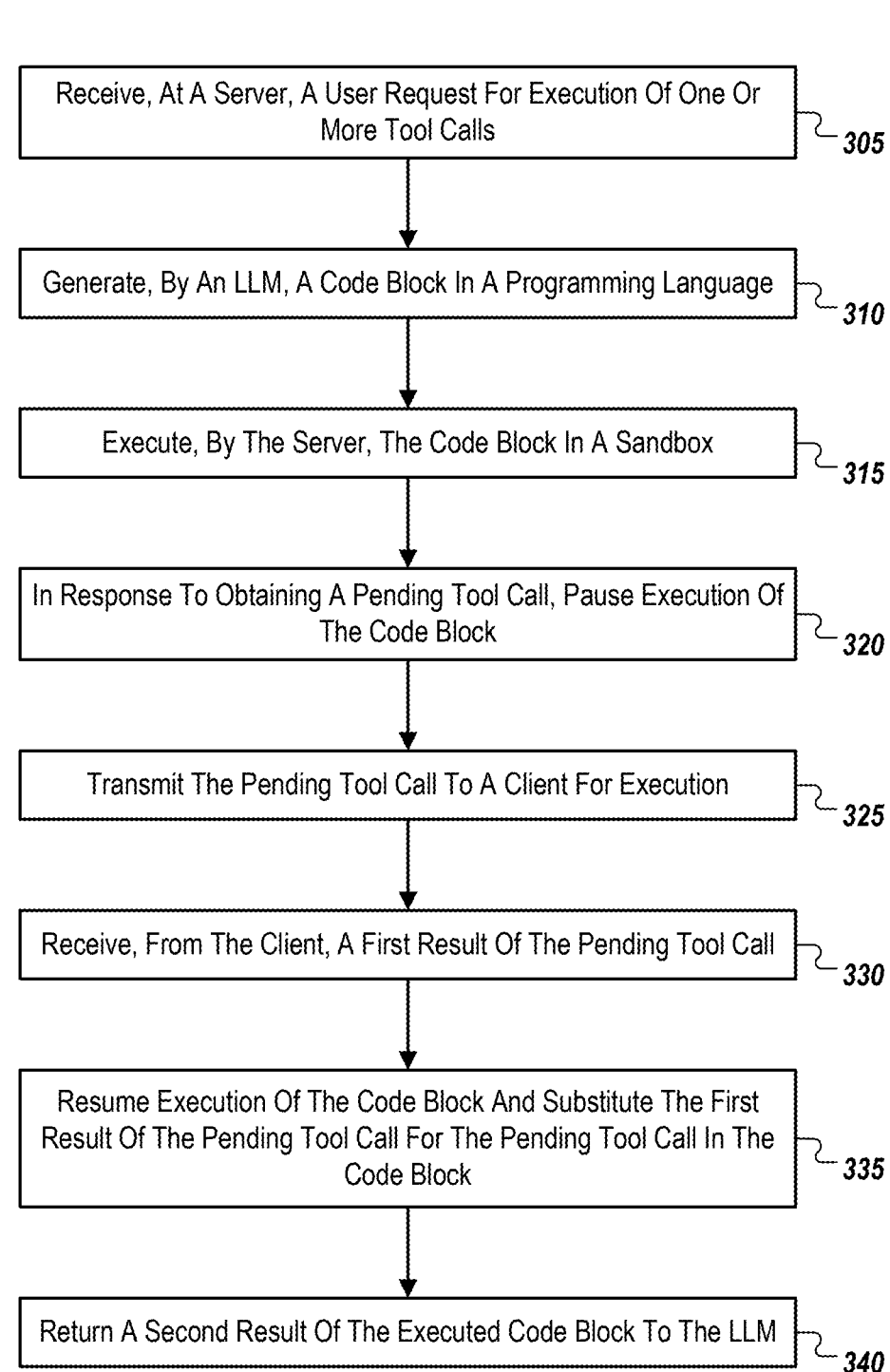

Receive, At A Server, A User Request For Execution Of One Or More Tool Calls — 305

Generate, By An LLM, A Code Block In A Programming Language — 310

Execute, By The Server, The Code Block In A Sandbox — 315

In Response To Obtaining A Pending Tool Call, Pause Execution Of The Code Block — 320

Transmit The Pending Tool Call To A Client For Execution — 325

Receive, From The Client, A First Result Of The Pending Tool Call — 330

Resume Execution Of The Code Block And Substitute The First Result Of The Pending Tool Call For The Pending Tool Call In The Code Block — 335

Return A Second Result Of The Executed Code Block To The LLM — 340

*FIG. 3*

CODE IMPLEMENTED TOOL CALLS

TECHNICAL FIELD

This disclosure generally relates to tool calls, and more specifically, to code implemented tool calls in a large language model system.

BACKGROUND

Unless otherwise indicated herein, the materials described herein are not prior art to the claims in the present application and are not admitted to be prior art by inclusion in this section.

In modern computing systems, large language models (LLMs) may be increasingly used to automate complex workflows by interacting with various tools and APIs. These LLMs often rely on tool calls to perform tasks such as retrieving data, manipulating files, and/or executing specific functions. Some traditional approaches may be rife with inefficiencies in context management, excessive token usage, and/or performance degradation, particularly when handling multiple or dependent operations. Existing systems may struggle to balance the need for efficient execution with the constraints of context size and the separation of concerns between server and client environments.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an example embodiment, a method may include receiving, at a server, a user request for execution of one or more tool calls. The method may also include generating, by a large language model (LLM), a code block in a programming language. The code block may be configured to encapsulate the one or more tool calls. The method may further include executing, by the server, the code block in a sandbox. The method may also include pausing execution of the code block in response to obtaining a pending tool call. The method may further include transmitting the pending tool call to a client for execution. The method may also include receiving, from the client, a first result of the pending tool call. The method may further include resuming execution of the code block and substituting the first result of the pending tool call for the pending tool call in the code block. The method may also include returning a second result of the executed code block to the LLM.

In another embodiment, a computing system may include a processor and a memory. The memory may store instructions that, when executed by the processor, cause the computing system to receive, at a server, a user request for execution of one or more tool calls. The computing system may also generate, by an LLM, a code block in a programming language. The code block may be configured to encapsulate the one or more tool calls. The computing system may further execute, by the server, the code block in a sandbox. The computing system may also pause execution of the code block in response to obtaining a pending tool call. The computing system may further transmit the pending tool call to a client for execution. The computing system may also receive, from the client, a first result of the pending tool call. The computing system may further resume execution of the code block and substituting the first result of the pending tool call for the pending tool call in the code block. The computing system may also return a second result of the executed code block to the LLM.

The objects and advantages of the embodiments will be realized and achieved at least by the elements, features, and combinations particularly pointed out in the claims.

Both the foregoing general description and the following detailed description are given as examples and are explanatory and not restrictive of the invention, as claimed.

DESCRIPTION OF DRAWINGS

Example implementations will be described and explained with additional specificity and detail using the accompanying drawings in which:

FIG. 1 illustrates a block diagram of an example system to perform code implemented tool calls;

FIG. 3 illustrates a flowchart of an example method for code implemented tool calls;

DETAILED DESCRIPTION

Figure 2:
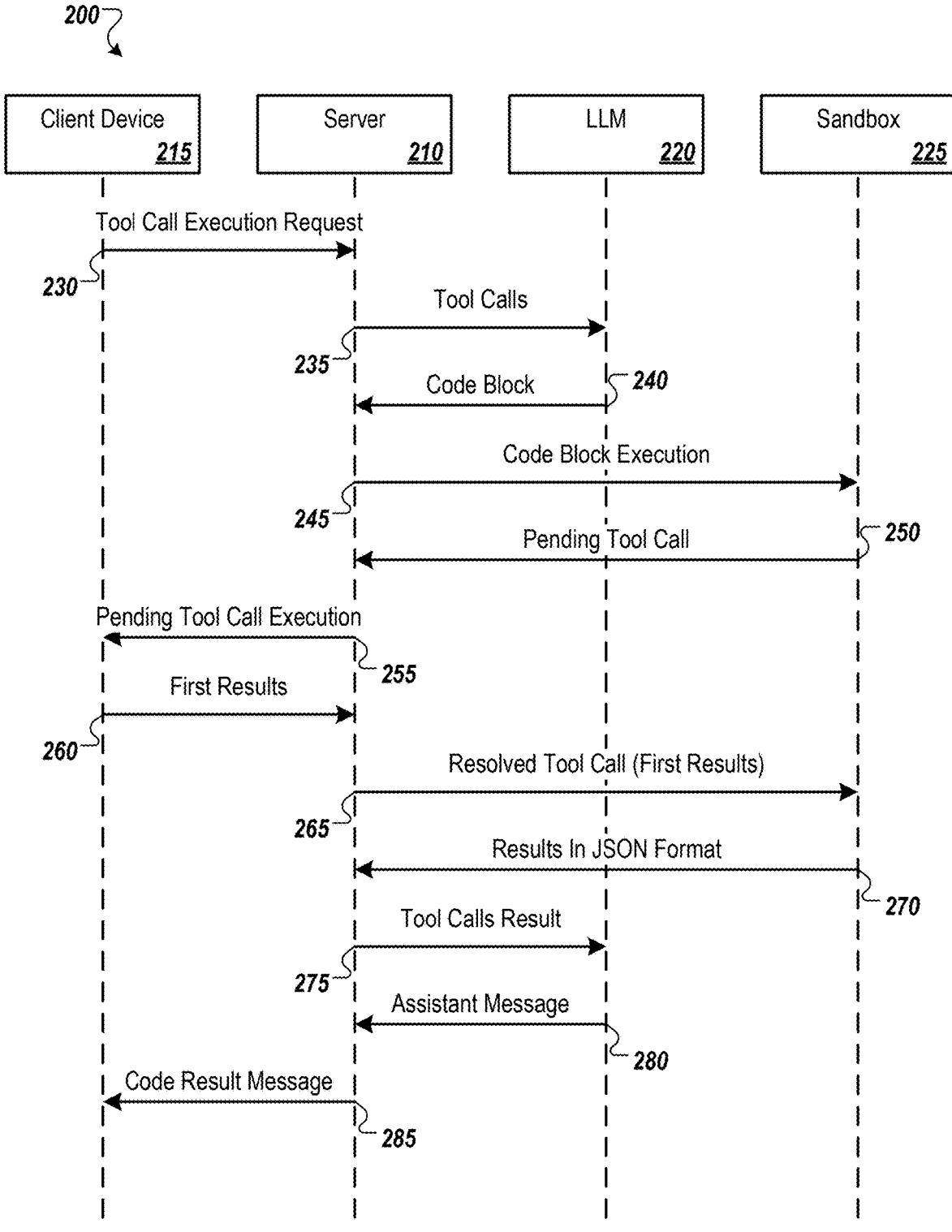
FIG. 2 illustrates a sequence diagram of an example workflow of code implemented tool calls.

Current computing systems that leverage large language models (LLMs) to automate workflows face significant challenges in managing tool calls while maintaining performance, scalability, and context optimization. As LLMs interact with a growing number of tools, both server-side and client-side, the volume of intermediate results and tool call states can overwhelm the model's context, leading to increased token usage, slower response times, and/or degraded performance. In some instances, delegating certain operations to client devices, such as accessing local files or user interfaces, may introduce complexity in orchestration, often resulting in fragmented execution flows, security concerns, and/or difficulties in maintaining a stateless architecture. Such issues may be compounded when workflows use a mix of parallel and sequential tool executions.

Some prior approaches may attempt to address such challenges by relying on discrete, step-by-step execution of tool calls, where each call and the corresponding result may be individually exposed to the LLM. Such approaches may bloat the context with intermediate data and/or may fail to optimize the orchestration of client-side and server-side operations. Some systems attempt to mitigate such issues by executing all tool calls on the server, which may require clients to run full code interpreters and may be impractical for many environments. Some approaches may lack the determinism and resumability for robust execution, particularly when handling errors or non-deterministic operations. Such shortcomings may result in inefficient context management, reduced performance, and/or an inability to seamlessly integrate client-specific operations without compromising the stateless and scalable nature of the system.

Aspects of the present disclosure address these and other shortcomings by introducing a stateless system for orchestrating tool calls in LLM applications that can encapsulate multiple tool calls within a single, executable code block.

The system may leverage a resumable code execution sandbox on the server that may be operable to execute the code block while seamlessly delegating client-specific tool calls to a client device, ensuring that only the final result may be exposed to the LLM. By employing an evaluation stack to deterministically replay the code block with updated results, the system may maintain efficiency, reduce context bloat, and may support both parallel and sequential tool execution without compromising security or scalability. Such an approach may reduce inefficiencies associated with discrete tool call execution, minimize token usage, and/or provide a robust framework for handling complex workflows in a context-optimized manner.

These and other techniques described herein may provide advantages for applications in very deep neural networks such as large language models, vision-language models, and audio language models, which may be used across different task domains including, for example, image processing tasks, more particularly image recognition tasks, where each image recognition task is the recognition of a different object or pattern in an image, and where the model output may include tokens, for example natural language text tokens or other tokens indicative of the result of the image recognition task, audio processing tasks, more particularly audio recognition tasks, where each audio input recognition task is the recognition of different sounds or patterns in an audio signal, and where the model output may include tokens, for example natural language text tokens or other tokens indicative of a result of the audio recognition task.

FIG. 1 illustrates a block diagram of an example system 100 to perform code implemented tool calls. The system 100 may include a network 105, which may function as a central communication medium that may enable data transmission between a server 110, a large language model (LLM) 120, a sandbox 125, and a client device 115. The network 105 may facilitate the exchange of data and instructions necessary for stateless orchestration of tool calls as described herein. Through the network 105, a user request originating from the client device 115 may be transmitted to the server 110, initiating the process of tool call execution. The network 105 may further enable the server 110 to communicate with the LLM 120, allowing the LLM 120 to generate a code block encapsulating one or more tool calls and transmit this code block back to the server 110 for execution within the sandbox 125.

During execution, if the sandbox 125 encounters a pending tool call that may use client-side execution, the network 105 may facilitate a transmission of the pending tool call from the server 110 to the client device 115. Upon execution of the pending tool call by the client device 115, the network 105 may facilitate the transmission of the resulting data back to the server 110. In some instances, the network 105 may support the stateless orchestration of tool calls, ensuring that intermediate results may not exposed to the LLM 120. In some instances, the network 105 may be a wireless network and/or a wired network to facilitate communications between the connected elements in the system 100.

In some instances, the server 110 may operate as a central processing unit within the system 100. Upon receiving a user request for execution of one or more tool calls via the network 105 from the client device 115, the server 110 may communicate with the LLM 120 to generate a code block in a programming language, such as TypeScript, that may encapsulate the requested tool calls. The server 110 may cause the code block to be executed within the sandbox 125, which may provide a controlled and/or resumable execution environment. During execution, the server 110 may be operable to monitor the progress of the code block execution and, upon encountering a pending tool call, the server 110 may cause the execution to pause and may transmit the pending tool call to the client device 115 via the network 105. In some instances, the pending tool call may be designated for client-side execution by the client device 115.

Once the client device 115 executes the pending tool call and returns the resulting data to the server 110, the server 110 may be operable to cause the execution of the code block in the sandbox 125 to resume. In such instances, the resulting data may be substituted for the pending tool call. This resumable execution process may be facilitated by an evaluation stack that may replay the code block from the beginning (of the code block within the sandbox 125), ensuring deterministic execution by capturing and replaying results of non-deterministic operations.

In some instances, the server 110 may return the result from the execution within the sandbox 125, which may represent a final output of the executed code block, to the LLM 120. In such instances, the LLM 120 may receive only the final result and may not receive intermediate results. As such, the server 110 may enable stateless orchestration of tool calls, where a clear separation between server-side orchestration and client-side execution may be present. In these and other instances, the server 110 may be a cloud-based server, a physical server, a distributed server system, an edge server, a virtual machine, and/or another other computing device operable to execute the code block within the sandbox 125 and/or communicate with the LLM 120 and the client device 115.

In some instances, the client device 115 may serve as the endpoint to execute client-side tool calls within the system 100. The client device 115 may be operable to transmit a user request for the execution of one or more tool calls to the server 110 via the network 105. Upon receiving a pending tool call from the server 110 (e.g., a tool call designated for client-side execution), the client device 115 may be operable to perform a corresponding operation, which may involve accessing local resources, user interfaces, or other client-specific functionalities that may not be executable on the server 110.

After executing the pending tool call, the client device 115 may be operable to return the resulting data to the server 110 via the network 105. As such, the server 110 may resume execution of the code block within the sandbox 125 using the obtained result from the execution of the pending tool call by the client device 115. The client device 115 may not participate in the generation or execution of the code block itself, but rather may be focused on fulfilling localized tool calls that may use direct access to the client environment associated with the client device 115.

The LLM 120 may function as an agent responsible for generating executable code blocks in response to user requests within the system 100. Upon receiving a user request from the server 110 via the network 105, the LLM 120 may generate a code block in a programming language, such as TypeScript, that may encapsulate one or more tool calls that may be used to fulfill the user request. The code block may be designed to abstract the complexity of individual tool calls, which may enable efficient and context-optimized execution. The LLM 120 may transmit the generated code block to the server 110, where the server 110 may execute the code block within the sandbox 125. During this process, the LLM 120 may remain agnostic to intermediate results of tool calls, as the server 110 may be operable to return the final result of the executed code block to the LLM 120 and not the intermediate results. As such, the LLM

120 may operate with minimal context overhead, which may in turn, improve performance and/or reducing token usage. The LLM 120 may not directly execute tool calls or interact with the client device 115. Rather, the LLM 120 may rely on the server 110 to orchestrate the execution, pause, and/or resumption of the code block, including delegation of client-side tool calls.

In some instances, the LLM 120 may receive error information to adjust or retry code generation, further enhancing robustness in tool call execution. In some instances, errors may occur from different sources, such as tool execution errors, code execution errors, non-deterministic operation errors, and/or network errors. For an error that may occur in the system 100, an error type may be obtained (e.g., a classification of the error), an error message generated and/or provided to a user, a location of the error within the system may be determined and/or provided, and/or contextual data associated with the error may be obtained. In instances in which an error is detected, the server 110 may provide the error and/or error information to the LLM 120 to interpret the error and perform a retry of the code block to correct the error.

The sandbox 125 may function as a controlled, resumable code execution environment within the system 100. The sandbox 125 may receive a code block generated by the LLM 120 from the server 110 via the network 105 and the sandbox 125 may execute the code block in an isolated environment. The execution environment of the sandbox 125 may be designed to facilitate pausing processing upon encountering a pending tool call that may use client-side execution. In such instances, the sandbox 125 may transmit the tool call to the client device 115 by the server 110. Upon receiving the result of the client-side tool call from the client device 115, the sandbox 125 may resume execution of the code block. The received result may be substituted for the pending tool call. The sandbox 125 may employ an evaluation stack to replay the code block from the beginning each time a new result may be received, which may ensure deterministic execution by capturing and replaying results of non-deterministic operations, such as time-dependent or random value generation. As such, the sandbox 125 may be stateless, as the sandbox 125 may not retain an execution state between interactions, and instead may rely on the deterministic replay of the code block with updated results.

In some instances, the sandbox 125 may capture and/or handle errors that may occur during code execution, such as syntax errors, runtime exceptions, or tool execution failures. When an error may be detected, the sandbox 125 may pause execution, capture associated error information, and may transmit the error information to the server 110. The server 110 may provide the error information to the LLM 120 for analysis and/or potential correction. In some instances, the sandbox 125 may support both parallel and sequential execution of tool calls, as dictated by the structure of the code block, using parallel execution constructs (e.g., Promise.all) and sequential execution constructs (e.g., await). By abstracting intermediate results and exposing the final output of the executed code block to the LLM 120, the sandbox 125 may ensure efficient context management and may minimize token usage.

Modifications, additions, or omissions may be made to the system 100 without departing from the scope of the present disclosure. For example, any of the components of FIG. 1 may be divided into additional or combined into fewer components.

FIG. 2 illustrates a sequence diagram 200 of an example workflow of code implemented tool calls. The sequence diagram 200 may illustrate a workflow associated with the system 100 of FIG. 1. The components of the sequence diagram 200, including the server 210, the client device 215, the LLM 220, and the sandbox 225, may be the same or similar as the server 110, the client device 115, the LLM 120, and the sandbox 125, respectively, of FIG. 1.

At reference 230, the client device 215 may initiate the execution of a tool call orchestration process by transmitting a tool call execution request to the server 210. The request may represent a user's input requesting the execution of one or more tool calls, which the server 210 may process in collaboration with the LLM 220 and/or the sandbox 225. Upon receiving the request, the server 210 may communicate with the LLM 220 to generate a code block based on the tool calls, where the code block may be configured to encapsulate the tool calls, as shown in reference 235.

At reference 240, the server 210 may obtain the code block for execution from the LLM 220. The code block, which may be written in a programming language such as TypeScript, may be designed to abstract the complexity of individual tool calls and optimize context management within the LLM 220. At reference 245, the sandbox 225 may obtain the code block to be executed and may begin executing the code block as instructed by the server 210. During execution, the sandbox 225 may monitor the progress of the code block execution and may identify any pending tool calls that may be performed by client-side execution.

In instances in which such a pending tool call may be encountered, the sandbox 225 may pause execution and, as illustrated at reference 250, the sandbox 225 may transmit the pending tool call to the server 210. At reference 255, the server 210 may forward the pending tool call to the client device 215 for execution. This delegation may ensure that client-specific operations (e.g., accessing local files or user interfaces) may be handled by the client device 215, which may facilitate the separation of concerns between server-side orchestration and client-side execution. The client device 215 may execute the pending tool call and, at reference 260, the client device 215 may return the first results of the pending tool call execution to the server 210. The first results may represent the output of the client-side tool call and may be used by the sandbox 225 when resuming the execution of the code block therein.

The server 210 may be operable to forward the first results to the sandbox 225, as illustrated in reference 265, where the sandbox 225 may substitute the first results into the paused code block. Using an evaluation stack, the sandbox 225 may replay the code block from the beginning thereof, and may incorporate the first results to ensure deterministic execution. The sandbox 225 may resume execution with the first results, replacing the pending tool call with the resolved output (e.g., the first results from the client device 215). This resumable execution process may allow the sandbox 225 to maintain statelessness while ensuring that the code block executes correctly with the latest data.

At reference 270, once the execution of the code block is completed, the sandbox 225 may generate a final result that may be prepared in a structured format, such as JSON. The sandbox 225 may transmit the final result to the server 210. At reference 275, the server 210 may be operable to forward the final result to the LLM 220, where the LLM 220 may use the final result to generate an assistant message. The assistant message may represent the final result of the executed code block and may be designed to provide the user with the requested information or action. At reference 280, the assistant message may be obtained by the server 210 from the LLM 220. At reference 285, the server 210 may transmit the assistant message to the client device 215, completing the interaction. The client device 215 may receive a code result message, which may include the final result of the executed code block, such that the user may obtain a concise and context-optimized response.

Modifications, additions, or omissions may be made to the sequence diagram 200 without departing from the scope of the present disclosure. For example, additional intermediate steps and/or extra steps in the sequence diagram 200 may be added or removed, respectively.

FIG. 3 illustrates a flowchart of an example method 300 for code implemented tool calls. The method 300 may be performed by processing logic that may include hardware (circuitry, dedicated logic, etc.), software (such as is run on a general purpose computer system or a dedicated machine), or a combination of both, which processing logic may be included in any computer system or device such as the system 100 and/or the server 110 of FIG. 1, the computing device 400 of FIG. 4, and/or the system 500 of FIG. 5.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification may be capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 300 may begin at block 305 where processing logic may receive, at a server, a user request for execution of one or more tool calls. In some instances, at least one tool call of the one or more tool calls may be designated for execution by the client.

At block 310, the processing logic may generate, by an LLM, a code block in a programming language. The code block may be configured to encapsulate the one or more tool calls. In some instances, the code block may support parallel execution and sequential execution of the one or more tool calls. The parallel execution may be achieved using a parallel execution construct. The sequential execution may be achieved using an await construct. In some instances, non-deterministic operations in the code block may be wrapped with a function that may be configured to store initial values of the non-deterministic operations.

At block 315, the processing logic may execute, by the server, the code block in a sandbox. In some instances, the sandbox may be a resumable code execution sandbox.

At block 320, the processing logic may pause execution of the code block in response to obtaining a pending tool call.

At block 325, the processing logic may transmit the pending tool call to a client for execution.

At block 330, the processing logic may resume execution of the code block. Alternatively, or additionally, the processing logic may substitute the first result of the pending tool call for the pending tool call in the code block. In some instances, resuming the execution of the code block may include using an evaluation stack that may replay the code block from a beginning of the code block. The evaluation stack may ensure deterministic execution by capturing and replaying results of non-deterministic operations.

At block 335, the processing logic may return a second result of the executed code block to the LLM. In some instances, the LLM may receive the second result and the LLM may not receive the first result.

Modifications, additions, or omissions may be made to the method 300 without departing from the scope of the present disclosure. For example, the processing logic may further translate, by the server, tool definitions associated with the one or more tool calls from a JSON schema into a type definition in the programming language. In some instances, the translation may occur prior to the code block generation by the LLM. In another example, the processing logic may further capture, by the server, error information and provide the error information to the LLM. The error information may be captured in response to determining an error in the execution of the one or more tool calls.

In another example, the designations of different elements in the manner described is meant to help explain concepts described herein and is not limiting. Further, the method 300 may include any number of other elements or may be implemented within other systems or contexts than those described.

Figure 4:
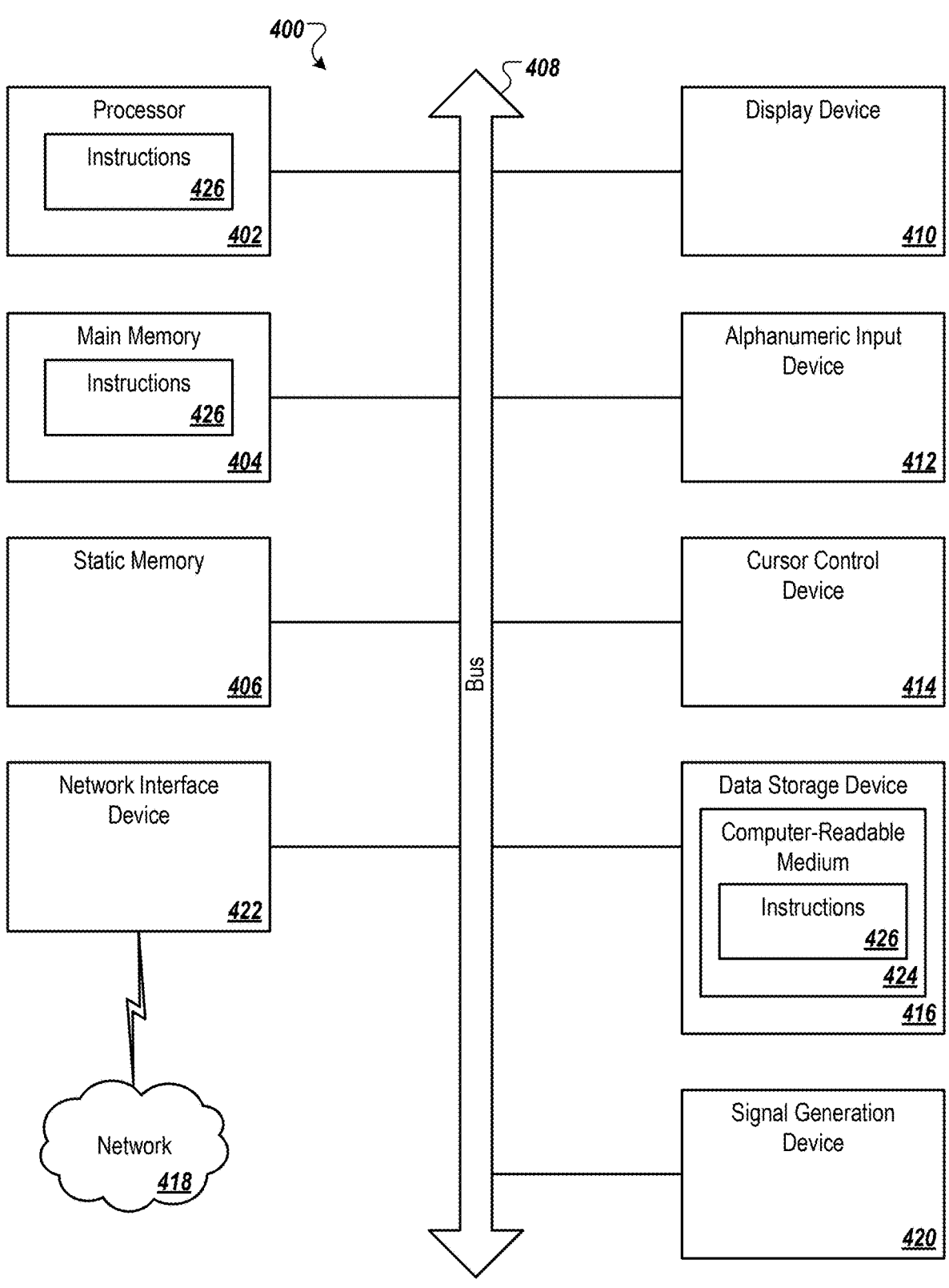
FIG. 4 illustrates an example computing device.

FIG. 4 illustrates an example computing device 400 within which a set of instructions, for causing the machine to perform any one or more of the methods discussed herein, may be executed. The computing device 400 may include a mobile phone, a smart phone, a netbook computer, a rack-mount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The computing device 400 includes a processing device 402 (e.g., a processor), a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

The processing device 402 represents one or more processing devices such as a microprocessor, CPU, GPU, TPU, NPU, DPU, and LPU, or the like. More particularly, the processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also include one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computing device 400 may further include a network interface device 422 which may communicate with a network 418 and may allow access via API, or any other interface. The computing device 400 also may include a display device 410 (e.g., a liquid crystal display (LCD), an array of light-emitting diodes (LEDs), an array of organic LEDs (OLEDs), etc.), an alphanumeric input device 412 (e.g., a keyboard), a cursor control device 414 (e.g., a mouse) and a signal generation device 420 (e.g., a speaker). In at least one implementation, the display device 410, the alphanumeric input device 412, and the cursor control device 414 may be combined into a single component or device (e.g., a touch screen).

The data storage device 416 may include a computer-readable storage medium 424 on which is stored one or more sets of instructions 426 embodying any one or more of the methods or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over the network 418 via the network interface device 422.

While the computer-readable storage medium 424 is shown in an example implementation to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media, high-bandwidth memory (HBM), and magnetic media.

Figure 5:
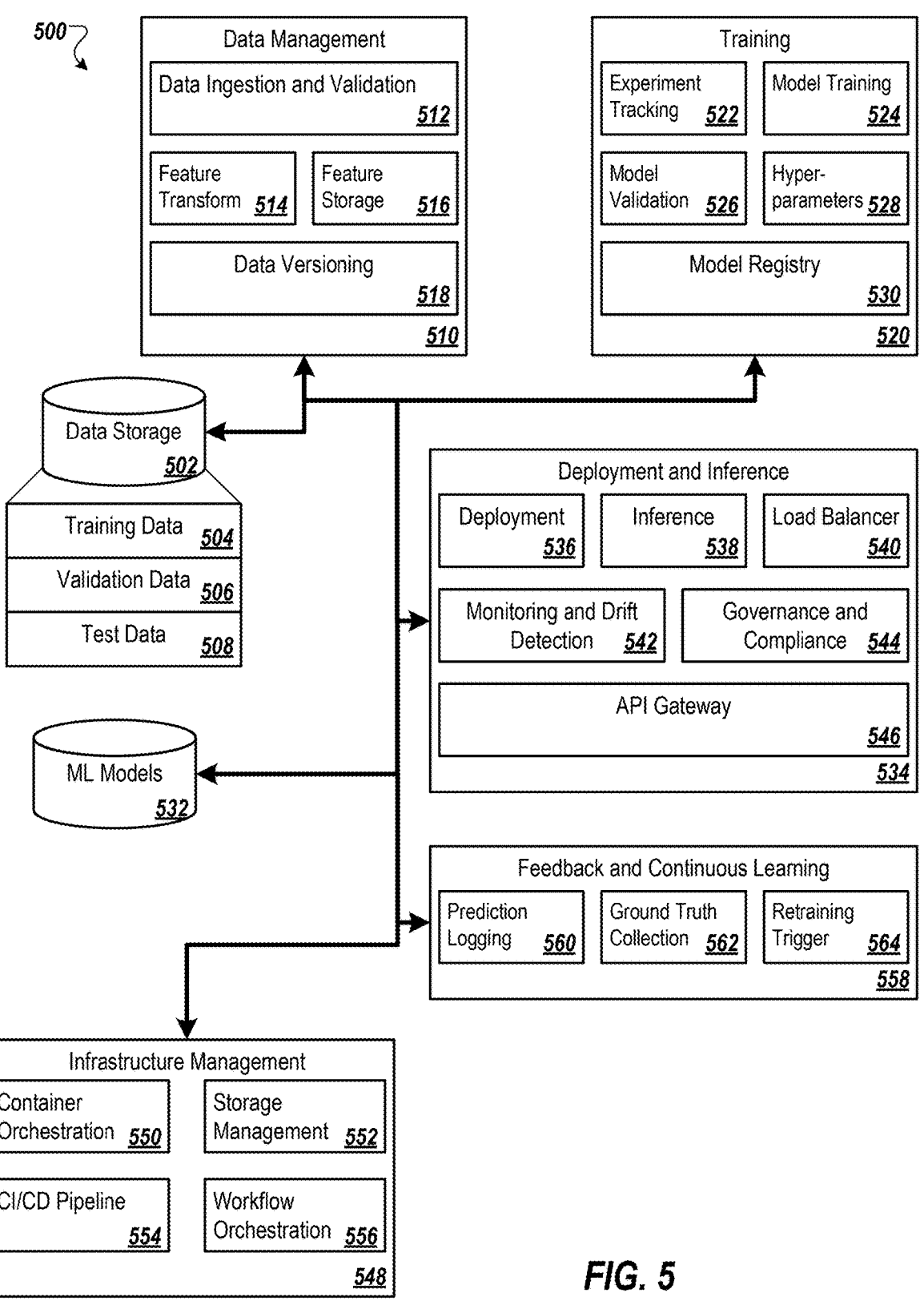
FIG. 5 illustrates a block diagram of a machine learning operations platform for managing classical machine learning workloads on structured data.

FIG. 5 is a block diagram illustrating a machine learning operations platform for managing classical machine learning workloads on structured data, according to some embodiments of the present disclosure.

System 500 may include data management engine 510 with data ingestion and validation engine 512, feature transform engine 514, feature storage engine 516, and data versioning engine 518. Data ingestion and validation engine 512 may access data from relational databases (PostgreSQL, MySQL), NoSQL databases (MongoDB, Cassandra), REST APIs, file systems (CSV, Parquet, JSON), and streaming sources (Kafka, Kinesis), performing comprehensive data quality checking including schema validation, data type verification, range validation, null handling, completeness assessment, consistency checking, and accuracy verification to address data quality problems identified as primary MLOps challenges. The engine may perform Exploratory Data Analysis (EDA) including statistical summaries, distribution analysis, correlation analysis, and outlier detection. Data versioning engine 518 may maintain complete lineage using DVC or Git-LFS with cryptographic hashing for reproducibility and provenance tracking. Data may be stored in data storage 502 containing training data 504, validation data 506, and test data 508.

Feature transform engine 514 may apply data augmentation techniques and transformations including numerical scaling (standardization, min-max), categorical encoding (one-hot, target encoding, entity augmentation), date/time extraction, text vectorization with embeddings (Word2Vec), polynomial generation, and aggregation functions. The engine may perform feature construction, feature selection using PCA and ICA, feature imputation for missing values, data cleaning (duplicates, inconsistencies), and data merging and matching across sources. Feature storage engine 516 may provide dual-mode storage with offline batch-oriented storage (Parquet on S3, Delta Lake) for training and online low-latency key-value databases (Redis, DynamoDB) for sub-millisecond inference. Features may be stored with metadata including name, type, entity key, timestamp, and lineage, with point-in-time correct retrieval preventing data leakage.

Model training engine 520 may include experiment tracking engine 522, model training engine 524, model validation engine 526, hyperparameters engine 528, and model registry engine 530. Experiment tracking engine 522 may log all training runs with hyperparameters, dataset versions, model architecture, training metrics, validation metrics, duration, resources, random seeds, business value metrics, and ethical considerations. Model training engine 524 may support ensemble methods (XGBoost, LightGBM, Random Forests, Extra Trees), linear models (Logistic Regression with L1/L2, Support Vector Machines), and additional algorithms (k-Nearest Neighbors, Naïve Bayes, Decision Trees). In some embodiments, a federated learning coordinator may modify the operation of training engine 520 to execute decentralized training processes. Instead of aggregating data in data storage 502, the federated learning coordinator may distribute an initial global model to remote client devices or siloed data centers. Each client may train the model locally on private data and compute model updates (gradients or weights), which are encrypted and transmitted back to federated learning coordinator 578. The federated learning coordinator may apply secure aggregation algorithms (e.g., federated averaging) to combine updates into a new global model without ever accessing the raw local data, addressing data sovereignty and privacy regulations while using distributed computational power.

Hyperparameters engine 528 may implement automated tuning using grid search, random search, Bayesian optimization, and successive halving, balancing performance with computational efficiency and constraints like inference latency and interpretability. Model validation engine 526 may implement k-fold cross-validation with stratification, time-series cross-validation with forward chaining, and backtesting, evaluating Quality of Model (QoM) using accuracy, precision, recall, F1, AUC-ROC for classification and RMSE, MAE, R-squared for regression, assessing predictive performance, computational efficiency, interpretability, fairness, and robustness with statistical significance testing. Model registry engine 530 may maintain serialized artifacts, metadata, dataset versions, feature versions, code versions, timestamps, and complete lineage, with models progressing through development, staging, production, and archived stages, supporting A/B testing with traffic allocation and tracking business value and ethical assessments. The registry may communicate with ML models database 532.

Deployment and inference engine 534 may include deployment engine 536, inference engine 538, load balancer engine 540, monitoring and drift detection engine 542, governance and compliance engine 544, and API gateway engine 546. Deployment engine 536 may implement canary deployment (gradual traffic shifting), blue-green deployment (instant switchover), and shadow deployment (parallel execution), with containerization via Docker and orchestration via Kubernetes with horizontal autoscaling. The deployment engine 536 may include an edge deployment engine to facilitate model execution on resource-constrained devices. The edge deployment engine may perform model compression techniques including quantization (e.g. reducing precision from 32-bit floating point to 8-bit integers), pruning (removing redundant network connections), and distillation (training smaller student models from larger teacher models). The edge deployment engine may convert serialized models into hardware-optimized formats (e.g., TensorFlow Lite, ONNX, TensorRT) compatible with specific edge accelerators (TPUs, NPUs, DSPs). The edge deployment engine may also manage a synchronization protocol to push model updates to distributed edge devices over intermittent network connections and pull aggregated federated learning updates back to the central system. Inference engine 538 may provide batch prediction processing stored data and real-time inference via REST/gRPC with feature retrieval from feature storage engine 515, using request batching, model caching, connection pooling, and adaptive timeouts.

Load balancer engine 540 may distribute traffic with routing tables for A/B testing, health checking, and circuit breaking. Monitoring and drift detection engine 542 may track latency percentiles, throughput, error rates, prediction distribution, and resource utilization, detecting data drift via Kolmogorov-Smirnov test, Population Stability Index, Jensen-Shannon divergence for numerical features and chi-square test for categorical features, implementing automated drift handling including feature recalibration, model retraining triggers, and alerts. Model drift detection may identify concept drift by tracking performance metrics, comparing prediction confidence distributions, and monitoring feature importance shifts, continuously evaluating QoM to detect degradation.

Governance and compliance engine 544 may implement RBAC with SAML/OAuth integration, immutable audit logs, SHAP-based explainability, and enforce ethical AI principles including fairness evaluation (demographic parity, equalized odds), bias detection and mitigation, human value considerations, and societal impact assessment. Compliance controls may include GDPR/CCPA requirements (data subject access, right to erasure, consent management, data minimization), maintaining business value, quality metrics, and ethical assessment documentation. API gateway engine 546 may provide authentication, authorization, rate limiting, request validation, protocol translation (REST/ gRPC), routing, caching, logging, service discovery, and health checking. In some embodiments, an advanced explainability and audit engine may extend the capabilities of governance and compliance engine 544 by generating counterfactual explanations (identifying minimal changes to input features required to flip a prediction decision). The advanced explainability and audit engine may provide global model interpretation via feature interaction analysis and local interpretation for specific high-risk predictions. The advanced explainability and audit engine may automatically generate regulatory compliance reports (e.g., for EU AI Act or FDA SaMD) by compiling model lineage, bias testing results from monitoring engine 542, and human-in-the-loop decision logs into an immutable audit trail, ensuring full traceability of automated decision-making processes.

Infrastructure management engine 548 may include container orchestration engine 550, storage management engine 552, CI/CD pipeline engine 554, and workflow orchestration engine 556. Container orchestration engine 550 may use Kubernetes with multiple clusters (training with GPUs, serving with autoscaling, infrastructure for orchestration/ monitoring), allocating CPU/GPU/xPU resources with quotas and preemption strategies addressing resource scarcity. Storage management engine 552 may provide object storage (S3) for data, datasets, feature stores, models, and logs, with lifecycle policies, replication, encryption, data quality assurance, and provenance tracking.

CI/CD pipeline engine 554 may automate linting, unit testing, integration testing, image building, vulnerability scanning, staging deployment, end-to-end testing, and production promotion, versioning training code and pipelines with tests, validating data quality, model quality, and system quality. Workflow orchestration engine 556 may coordinate DAG-based workflows with dependency resolution, task scheduling, retry logic, timeout handling, data passing, and health monitoring for training pipelines, batch prediction, and continuous retraining workflows.

Feedback and continuous learning engine 558 may include prediction logging engine 560, ground truth collection engine 562, and retraining trigger engine 564. Prediction logging engine 560 may capture predictions with input features, model version, output, confidence, timestamp, metadata, and unique identifiers in compressed columnar formats with privacy controls. Ground truth collection engine 562 may gather outcomes via explicit feedback, implicit signals (click-through, conversion), business system updates, and manual labeling, associating labels with prediction identifiers with quality assurance, handling delayed labels, and assessing business value and human impact.

Retraining trigger engine 564 may initiate retraining via policy-based schedules, event-based triggers (data availability), or drift-based triggers (exceeding thresholds from monitoring and drift detection engine 542), implementing sophisticated drift handling balancing freshness with computational costs and business continuity. Retraining may fetch production data with ground truth, merge with historical data with recency weighting, execute training pipelines, validate against production models evaluating technical quality and business value, and promote if performance improves, creating continuous improvement loops feeding back to data management engine 510 while maintaining business value delivery and ethical AI principles.

In operational deployment, system 500 may execute continuous workflows. Data ingestion and validation engine 512 may continuously ingest data from source systems, may perform real-time quality validation, and may version each batch in data storage 502. Feature transform engine 514 may apply configured transformations and may write results to feature storage engine 516, maintaining synchronized offline and online stores. Initially, or when retraining trigger engine 564 may signal need, training engine 520 may retrieve historical features from the offline store, with experiment tracking engine 522 logging each training iteration while model training engine 524 may execute algorithms, hyperparameters engine 528 may optimize configurations, and model validation engine 526 may evaluate QoM against validation data 506. Validated models may be registered in model registry engine 530 and may be stored in ML models database 532 with complete lineage. Deployment engine 536 may execute canary or blue-green deployments, containerizing models and deploying to serving infrastructure via container orchestration engine 550. Production inference requests may arrive at API gateway engine 546, which may authenticate and may route to load balancer engine 540, distributing traffic across inference engine 538 instances. For each request, inference engine 538 may retrieve current features from the online feature store, may apply transformations, may invoke the model, and may return predictions. Simultaneously, prediction logging engine 560 may capture all predictions with inputs and outputs. Monitoring and drift detection engine 542 may continuously analyze incoming data distributions, model performance metrics, and prediction patterns, detecting data drift via statistical tests and model drift via performance degradation. When drift may exceed configured thresholds or scheduled intervals may occur, retraining trigger engine 564 may initiate automated retraining by signaling training engine 520, which may fetch recent production data merged with ground truth labels collected by ground truth collection engine 562. The newly trained model may undergo validation against the current production model, and if QoM may improve beyond significance thresholds while maintaining ethical standards verified by governance and compliance engine 544, deployment engine 536 may promote the new model version through staged rollout. This may create a closed-loop system where production data may continuously improve models without manual intervention. Workflow orchestration engine 556 may coordinate all activities as DAG-based workflows, managing dependencies between data ingestion, feature engineering, training, deployment, and monitoring tasks, with CI/CD pipeline engine 554 ensuring all code changes may undergo automated testing before deployment, maintaining system reliability while enabling rapid iteration.

Security management engine 570 may implement end-to-end encryption protocols, securing data at rest within data storage 502 and feature storage engine 516, and securing data in transit during communication between engines. The engine may manage cryptographic keys through a dedicated Key Management Service (KMS) with automatic rotation policies. Further, security management engine 570 may implement differential privacy techniques during the training phase, injecting statistical noise into gradients to prevent model inversion attacks or membership inference attacks, thereby ensuring that individual data points cannot be reverse-engineered from the trained model artifacts stored in model registry engine 530.

Cost management and optimization engine 572 may monitor computational expenditure across infrastructure management engine 548. It may implement budget attribution tagging to specific projects or departments and provide real-time cost forecasting. The engine may dynamically optimize resource allocation by leveraging spot instances for interruptible workloads (such as batch training or hyperparameter tuning) and reserved instances for steady-state workloads (such as model serving), automatically migrating workloads based on price-performance heuristics. Additionally, it may identify idle resources, such as unattached GPU volumes or stalled notebook sessions, and trigger automated shutdown or archival procedures to enforce financial efficiency.

Interactive development environment (IDE) engine 576 may provide a collaborative workspace connected to data management engine 510 and training engine 520. This engine may support multi-tenant kernels, allowing data scientists to share memory contexts and computing resources securely. It may implement background versioning, automatically linking code execution to experiment tracking engine 522, ensuring that ad-hoc experiments are reproducible. The IDE engine may also include a visual pipeline builder, enabling users to define directed acyclic graphs (DAGs) for workflow orchestration engine 556 using a drag-and-drop interface that compiles into executable pipeline code (e.g., Airflow or Kubeflow pipelines).

Components of system 500 may communicate via I/O devices and network interfaces. Each engine may be a module implemented using computing devices with load-balancing for stable resource distribution. The platform may address common MLOps challenges including data quality problems, resource limitations, and deployment difficulties through integrated automation and comprehensive quality management spanning the entire machine learning lifecycle.

Figure 6:
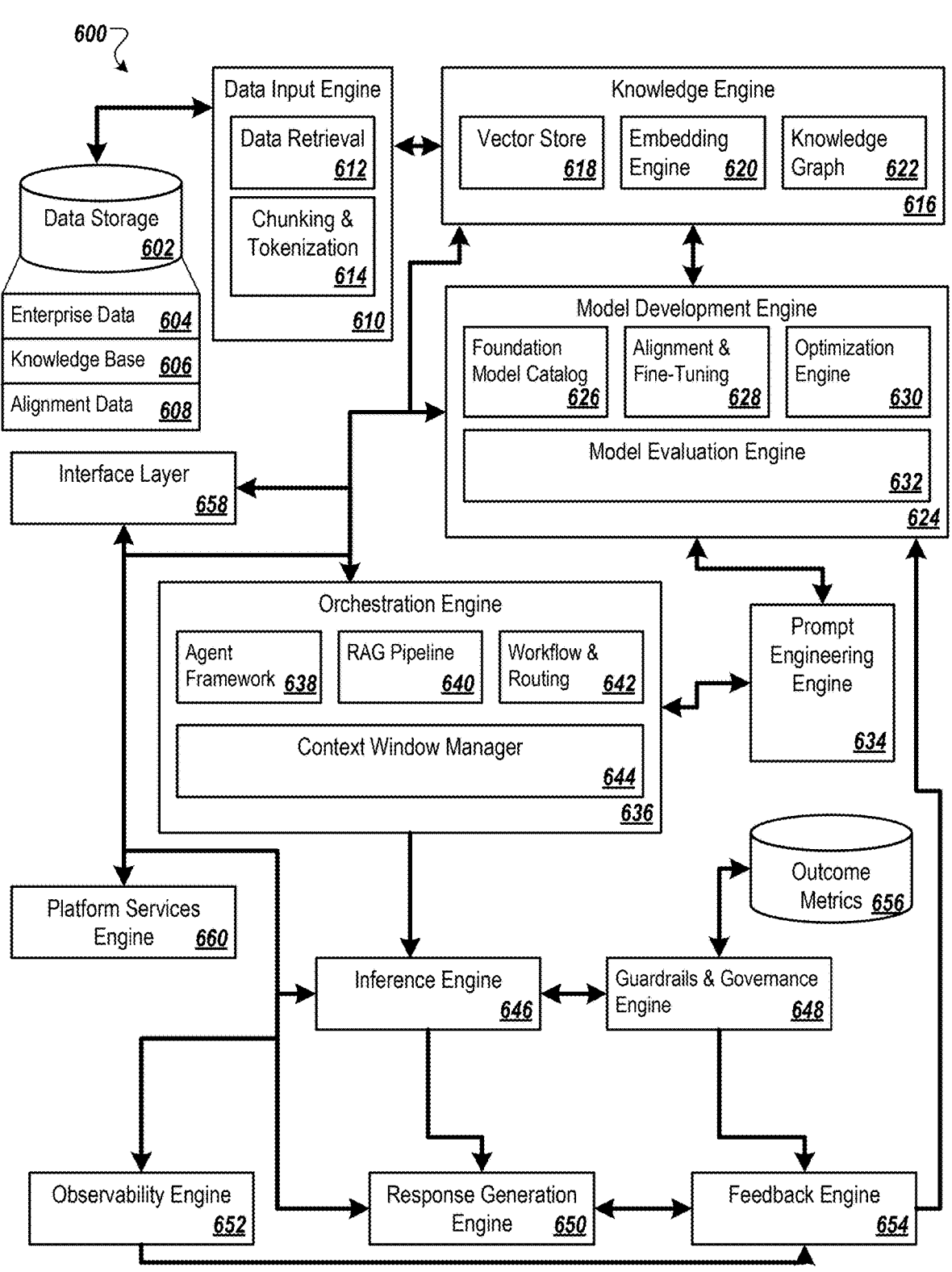
FIG. 6 illustrates a block diagram of a Generative Artificial Intelligence (GenAI) and Large Language Model Operations (LLMOps) system architecture.

FIG. 6 illustrates a block diagram of a Generative Artificial Intelligence (GenAI) and Large Language Model Operations (LLMOps) system architecture 600 according to one or more embodiments. The system architecture 600 may comprise a data storage 602, a data input engine 610, a knowledge engine 616, a model development engine 624, a prompt engineering engine 634, an orchestration engine 636, an inference engine 646, a guardrails and governance engine 648, a response generation engine 650, an observability engine 652, a feedback engine 654, an outcome metrics store 656, an interface layer 658, and a platform services engine 660.

The data storage 602 may comprise enterprise data 604 including structured databases, unstructured data lakes, real-time streaming data, Application Programming Interface (API) endpoints, and document repositories; knowledge base 606 containing domain-specific documentation and reference materials for Retrieval-Augmented Generation (RAG); and alignment data 608 including instruction-tuning datasets, human preference data for Reinforcement Learning from Human Feedback (RLHF) and Direct Preference Optimization (DPO), and multi-modal inputs for model alignment.

The data input engine 610 may be communicatively coupled to the data storage 602 and may include a data retrieval component 612 that may fetch data via database connectors, API calls, and streaming consumers, and a chunking and tokenization component 614 that may segment documents for embedding, may apply tokenization using Byte-Pair Encoding (BPE) or SentencePiece, may perform Personally Identifiable Information (PII) detection and masking, and may maintain data lineage tracking.

The knowledge engine 616 may be communicatively coupled to the data input engine 610 and may include a vector store 618 providing embedding storage with Approximate Nearest Neighbor (ANN) based similarity search, hybrid dense/sparse retrieval, namespace isolation, and metadata filtering; an embedding engine 620 that may generate vector representations; and a knowledge graph 622 that may perform entity extraction, relationship mapping, ontology management, graph traversal, and semantic reasoning supporting Graph RAG.

The model development engine 624 may be communicatively coupled to the knowledge engine 616 and may include a foundation model catalog 626 that may maintain a registry of approved models, Low-Rank Adaptation (LoRA) and Quantized Low-Rank Adaptation (QLoRA) adapter weights, versions, artifacts, lineage tracking, and stage transitions with access control; an alignment and fine-tuning component 628 that may support Parameter-Efficient Fine-Tuning (PEFT) methods, instruction tuning, RLHF, DPO, Odds Ratio Preference Optimization (ORPO), constitutional Artificial Intelligence (AI), domain adaptation, and adapter composition; an optimization engine 630 that may perform quantization (INT4/INT8/FP8), pruning, sparsification, knowledge distillation, model merging, speculative decoding, and Key-Value (KV) cache optimization; and a model evaluation engine 632 that may provide perplexity measurement, Bilingual Evaluation Understudy (BLEU) and Recall-Oriented Understudy for Gisting Evaluation (ROUGE) scores, human preference evaluation, LLM-as-judge auto-evaluation, A/B testing, red teaming, and hallucination detection.

The prompt engineering engine 634 may be communicatively coupled to the model development engine 624 and may manage prompt templates, version control, chain-of-thought and meta-prompting, few-shot management, prompt optimization, A/B testing, dynamic prompting, prompt chaining, and playgrounds, supporting Chain of Thought, Tree of Thought, ReAct, and Assumed Expertise patterns.

The orchestration engine 636 may be communicatively coupled to the prompt engineering engine 634 and knowledge engine 616, and may include an agent framework 638 that may provide multi-agent orchestration, tool use, function calling, planning, reasoning, goal decomposition, self-reflection, human-in-the-loop controls, and memory management; a RAG pipeline 640 that may perform query understanding, dense/sparse/hybrid retrieval, reranking, context augmentation, citation generation, and grounding with agentic and corrective RAG support; a workflow and routing component 642 that may provide Directed Acyclic Graph (DAG) orchestration, conditional branching, parallel execution, state management, error handling, async processing, multi-model gateway, dynamic model selection, cost-aware routing, and load balancing; and a context window manager 644 that may handle context optimization, long-context strategies, summarization, sliding windows, priority-based pruning, and semantic caching.

The interface layer 658 may be communicatively coupled to the orchestration engine 636 and may provide chat interfaces, Integrated Development Environment (IDE) plugins, admin dashboards, mobile apps, voice interfaces, widgets, messaging integrations, API playgrounds, and no-code builders, handling external integrations with enterprise systems, identity providers, APIs, Model Context Protocol (MCP) servers, and webhooks.

The inference engine 646 may be communicatively coupled to the orchestration engine 636 and may provide Large Language Model (LLM) serving via vLLM, TensorRT-LLM, or Text Generation Inference (TGI), implementing continuous batching, PagedAttention, tensor/pipeline parallelism, streaming generation, and multi-Graphics Processing Unit (GPU) inference, with API gateway functionality including rate limiting, authentication, validation, and metering, plus semantic caching, KV cache optimization, and prefix caching. A model cascade engine 672 may function as a specialized component of orchestration engine 636. This engine may implement a tiered routing strategy based on query complexity scoring, intent classification, and cost-latency constraints. The model cascade engine 672 may initially route requests to a lightweight, low-latency model (e.g., a 7B parameter model or a quantified SLM); if the confidence score of the response falls below a configured threshold, the model cascade engine 672 may automatically escalate the request to a more capable foundation model (e.g., a 70B+ parameter model or proprietary frontier model). The model cascade engine 672 may also perform "token arbitrage," dynamically selecting the most cost-effective provider for a given prompt length and required capability level, managing API budgets in real-time.

The guardrails and governance engine 648 may be communicatively coupled to the inference engine 646 and may provide input guardrails including prompt injection detection, jailbreak prevention, and validation; output guardrails including content filtering, toxicity detection, PII redaction, hallucination detection, and factuality checking; and governance controls including policy enforcement, audit logging, data residency, General Data Protection Regulation (GDPR), California Consumer Privacy Act (CCPA), System and Organization Controls 2 (SOC2), Health Insurance Portability and Accountability Act (HIPAA), and European Union (EU) AI Act compliance, bias detection, fairness assessment, and explainability features.

The response generation engine 650 may be communicatively coupled to the inference engine 646 and guardrails and governance engine 648, formatting responses after validation with streaming delivery, multi-modal formatting, and citations. Response generation engine 650 may include a content provenance and watermarking engine. The content provenance and watermarking engine may embed imperceptible cryptographic watermarks into generated text (using token selection biasing or synonym substitution patterns) and generated images/audio (using spectral modifications) to establish machine authorship. The content provenance and watermarking engine may implement C2PA (Coalition for Content Provenance and Authenticity) standards to cryptographically sign metadata associated with the output, linking the generated content back to the specific model version, system prompt, and retrieved knowledge chunks used in its creation. This ensures verifiable distinctness between human-created and AI-generated content for regulatory compliance and copyright protection.

The observability engine 652 may be communicatively coupled to the inference engine 646 and response generation engine 650, providing latency monitoring (P50/P95/P99), throughput metrics, time to first token, error rates, GPU utilization, alerting, logging, token usage tracking, prompt versioning, distributed tracing with LLM-specific spans, quality scoring, and drift detection.

The feedback engine 654 may be communicatively coupled to the response generation engine 650 and outcome metrics store 656, collecting explicit feedback including ratings and preference comparisons, capturing implicit signals, managing annotation pipelines, implementing active learning, and curating datasets.

The outcome metrics store 656 may be communicatively coupled to the guardrails and governance engine 648, feedback engine 654, and model development engine 624, persisting quality scores, token costs, usage patterns, drift results, and preference signals, thereby providing a feedback loop for continuous model improvement.

The platform services engine 660 may provide cross-cutting infrastructure communicatively coupled to the orchestration engine 636 and inference engine 646, including Continuous Integration and Continuous Deployment (CI/CD) pipelines with GitOps, deployment automation, canary releases, rollback, infrastructure as code, container orchestration, secret management, cost management, experiment tracking, collaboration tools, and low-code tooling supporting an expanded builder persona.

Synthetic data generation engine 670 may be communicatively coupled to model development engine 624 and knowledge engine 616. This engine may use larger "teacher" models to generate diverse instruction-response pairs, reasoning traces, and edge-case scenarios based on documents retrieved from knowledge base 606. It may implement automated quality filtering pipelines that evaluate synthetic examples for factual correctness, logical consistency, and adherence to style guides before depositing them into alignment data 608. The engine may further employ "self-instruct" protocols to iteratively expand the complexity of training data, thereby enabling the training of smaller, task-specific "student" models (e.g. small language models, SLMs) that achieve high performance with reduced inference costs.

A confidential computing enclosure may provide a Trusted Execution Environment (TEE) for sensitive components of inference engine 646 and knowledge engine 616. This enclosure may ensure that data-in-use, including user prompts, retrieved RAG context, and model weights, remains encrypted within memory during processing. It may use hardware-based isolation technologies (such as Intel SGX, AMD SEV, or NVIDIA Confidential Computing) to prevent the cloud provider or unauthorized root users from accessing decrypted tensors or embedding vectors. This allows the system to process highly regulated data (PII, PHI, trade secrets) on public cloud infrastructure while maintaining cryptographic isolation.

Multi-modal processing engine 674 may extend the capabilities of data input engine 610 and embedding engine 620. It may comprise specialized encoders for non-textual data, including Vision Transformers (ViT) for image understanding and audio encoders (e.g., Whisper) for speech transcription. This engine may project different modalities into a shared high-dimensional semantic space (e.g., using CLIP or SigLIP methodologies), enabling "cross-modal retrieval" where a text query can retrieve relevant images, audio clips, or video segments from vector store 618. It may also implement "visual prompting," allowing users to upload images as context alongside text instructions for the inference engine 646.

In operation, the interface layer 658 may receive user requests and may transmit them to the orchestration engine 636, which may process requests using the agent framework 638, RAG pipeline 640, and workflow component 642. The RAG pipeline 640 may retrieve context from the knowledge engine 616 for grounding. The orchestration engine 636 may transmit requests to the inference engine 646, which may generate responses using models from catalog 626 with prompts from engine 634. The guardrails and governance engine 648 may validate responses, the response generation engine 650 may deliver them via interface layer 658, and feedback engine 654 may collect feedback. The outcome metrics store 656 may aggregate metrics for continuous improvement via model development engine 624, while platform services engine 660 may provide infrastructure support throughout.

During day-to-day operation, the system architecture 600 may operate in two concurrent modes: a request-response mode for serving end users and a continuous improvement mode for maintaining and enhancing model quality. In request-response mode, a user request may arrive at the interface layer 658 via API call, chat message, or integrated application. The orchestration engine 636 may analyze the request to determine whether retrieval augmentation is required, selecting an appropriate workflow path. For knowledge-intensive queries, the RAG pipeline 640 may query the vector store 618 to retrieve semantically relevant document chunks, which may be reranked and injected into the prompt context. The context window manager 644 may optimize the assembled context to fit within model token limits, potentially summarizing or pruning lower-priority content. The inference engine 646 may then execute the generation request, batching it with other concurrent requests to maximize GPU utilization, while streaming tokens back to the user as they are generated. The guardrails and governance engine 648 may intercept both the input prompt and output response in real-time, blocking or modifying content that violates policy constraints. Each request may be logged by the observability engine 652 with full traceability including latency breakdowns, token counts, model version, and prompt template identifiers.

In continuous improvement mode, the platform services engine 660 may orchestrate scheduled and event-driven workflows that maintain system health and model quality. The feedback engine 654 may continuously aggregate user signals, and when sufficient preference data accumulates, may trigger the alignment and fine-tuning component 628 to generate updated adapter weights. The model evaluation engine 632 may run automated benchmark suites against candidate models, comparing performance against baseline metrics stored in outcome metrics store 656. Upon passing evaluation thresholds, the platform services engine 660 may execute a canary deployment, routing a small percentage of traffic to the new model version while the observability engine 652 monitors for quality regressions or latency degradation. If metrics remain healthy, traffic may be gradually shifted until the new model serves all requests. Concurrently, the data input engine 610 may process newly ingested documents, the embedding engine 620 may generate vectors, and the vector store 618 may update its indices, ensuring the knowledge engine 616 reflects current enterprise knowledge. This dual-mode operation may enable the system architecture 600 to serve low-latency user requests while continuously adapting to new data, user feedback, and evolving requirements without service interruption.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although implementations of the present disclosure have been described in detail, various changes, substitutions, and alterations could be made hereto without departing from the spirit and scope of the present disclosure.

What is claimed is:

1. A method, comprising:
   receiving, at a server, a user request for execution of one or more tool calls;
   generating, by a large language model (LLM), a code block in a programming language, the code block configured to encapsulate the one or more tool calls;
   executing, by the server, the code block in a sandbox;
   in response to obtaining a pending tool call, pausing execution of the code block;
   transmitting the pending tool call to a client for execution;
   receiving, from the client, a first result of the pending tool call;
   resuming execution of the code block and substituting the first result of the pending tool call for the pending tool call in the code block; and
   returning a second result of the executed code block to the LLM.

2. The method of claim 1, wherein at least one tool call of the one or more tool calls is designated for execution by the client.

3. The method of claim 1, wherein the sandbox is a resumable code execution sandbox.

4. The method of claim 1, wherein resuming the execution of the code block comprises using an evaluation stack that replays the code block from a beginning of the code block.

5. The method of claim 4, wherein the evaluation stack ensures deterministic execution by capturing and replaying results of non-deterministic operations.

6. The method of claim 1, wherein the LLM receives the second result and does not receive the first result.

7. The method of claim 1, wherein:
   the code block supports parallel execution and sequential execution of the one or more tool calls;
   the parallel execution is achieved using a parallel execution construct; and
   the sequential execution is achieved using an await construct.

8. The method of claim 1, further comprising translating, by the server, tool definitions associated with the one or more tool calls from a JSON schema into a type definition in the programming language prior to generating the code block by the LLM.

9. The method of claim 1, wherein in response to determining an error in the execution of the one or more tool calls, capturing error information and providing the error information to the LLM.

10. The method of claim 1, further comprising wrapping non-deterministic operations in the code block with a function configured to store initial values of the non-deterministic operations.

11. A computing system, comprising:
   a processor; and
   a memory storing instructions that, when executed by the processor, cause the computing system to:
      receive, at a server, a user request for execution of one or more tool calls;
      generate, by an LLM, a code block in a programming language, the code block configured to encapsulate the one or more tool calls;
      execute, by the server, the code block in a sandbox;
      in response to obtaining a pending tool call, pause execution of the code block;
      transmit the pending tool call to a client for execution;
      receive, from the client, a first result of the pending tool call;
      resume execution of the code block and substituting the first result of the pending tool call for the pending tool call in the code block; and
      return a second result of the executed code block to the LLM.

12. The computing system of claim 11, wherein at least one tool call of the one or more tool calls is designated for execution by the client.

13. The computing system of claim 11, wherein the sandbox is a resumable code execution sandbox.

14. The computing system of claim 11, wherein resume the execution of the code block comprises use an evaluation stack that replays the code block from a beginning of the code block.

15. The computing system of claim 14, wherein the evaluation stack ensures deterministic execution by capturing and replaying results of non-deterministic operations.

16. The computing system of claim 11, wherein the LLM receives the second result and does not receive the first result.

17. The computing system of claim 11, wherein:
   the code block supports parallel execution and sequential execution of the one or more tool calls;
   the parallel execution is achieved using a parallel execution construct; and
   the sequential execution is achieved using an await construct.

18. The computing system of claim 11, wherein the computing system is further operable to translate, by the server, tool definitions associated with the one or more tool calls from a JSON schema into a type definition in the programming language prior to generating the code block by the LLM.

19. The computing system of claim 11, wherein in response to determining an error in the execution of the one or more tool calls, capture error information and providing the error information to the LLM.

20. The computing system of claim 11, wherein the computing system is further operable to wrap non-deterministic operations in the code block with a function configured to store initial values of the non-deterministic operations.

* * * * *